Figure 1:
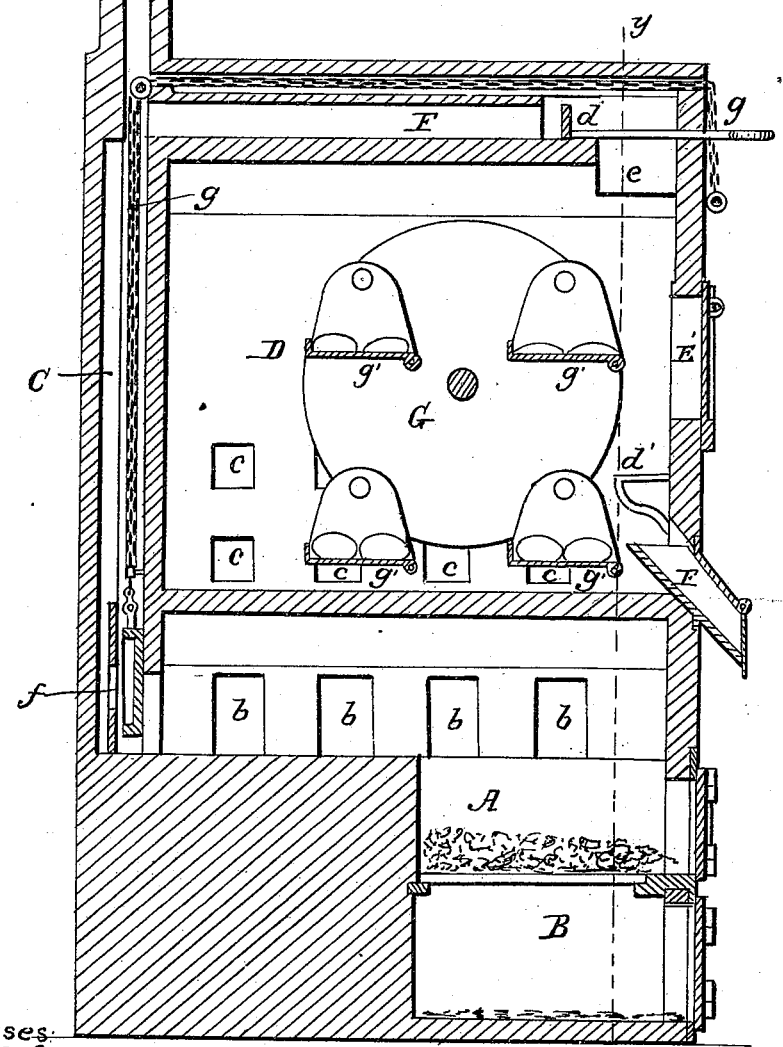

3 Sheets—Sheet 1.

I. W. KNAPP.
Baker's Oven.

No. 34,432.

Patented Feb. 18, 1862.

I. W. KNAPP.

Baker's Oven.

No. 34,432.

3 Sheets—Sheet 3.

Patented Feb. 18, 1862.

UNITED STATES PATENT OFFICE.

IVERSON W. KNAPP, OF NEW YORK, N. Y.

IMPROVEMENT IN BAKERS' OVENS.

Specification forming part of Letters Patent No. 34,432, dated February 18, 1862.

*To all whom it may concern:*

Be it known that I, IVERSON WILSON KNAPP, of the city, county, and State of New York, have invented a new and useful Improvement in Bake-Ovens; and I do hereby declare that the following is a full, clear, and exact description of the same, reference being had to the annexed drawings, making a part of this specification.

My said improvement relates to and is especially adapted to the mechanical bake-oven known as the "reel" oven, the same substantially as described in the schedule annexed to the Letters Patent granted to Hosea Ball, bearing date September 23, 1856. In said oven the products of combustion pass from the fire-box into a large chamber immediately underneath the oven, and from thence into the oven, which is a chamber containing gravitating bread-pans suspended from a rotating apparatus called a "reel." The reel chamber or bake-oven containing the reel and pans has proper apertures in front for charging and discharging the bread. It is heated partly by radiation of heat through the arch, which constitutes the bottom of the oven and the top of the fire-chamber, but chiefly by products of combustion which pass into the oven from the fire-chamber through suitable apertures or perforations in the reel-chamber or oven, which is called a "perforated chamber" in said patent of Ball, above referred to. A draft-flue from the top of the oven connects with the chimney. This flue, governed by a proper damper, is the only outlet for the products of combustion generated in the fire-box, which must always pass through the perforated chamber or bake-oven on their way to the chimney. The products of perfect combustion of anthracite, which this oven is especially adapted to burn, are not ordinarily injurious to bread or other articles baked in the oven; but vapors and gases arising from imperfect combustion and from decomposition of substances accidently mixed with the coal, smoke from kindling-wood, and dust from the fire when it is raked pass into the baking-chamber, deteriorating the bread and injuring the health of the operator at the charging-door.

The nature of my said invention consists in combining with the said reel oven an additional flue or passage-way, through which vapors and products of combustion may pass from the fire-box to the chimney without having to pass through the perforated or baking chamber, the said flue being governed by a suitable damper, so that it may be closed whenever it is desired to pass all the products of combustion through the perforated or baking chamber or opened to draw off vapors, noxious gases, &c., directly to the chimney for the purpose of preventing to a great degree, if not wholly, their presence in the perforated or baking chamber.

The drawings annexed represent my improvement combined with a Ball reel-oven.

Figure 2:
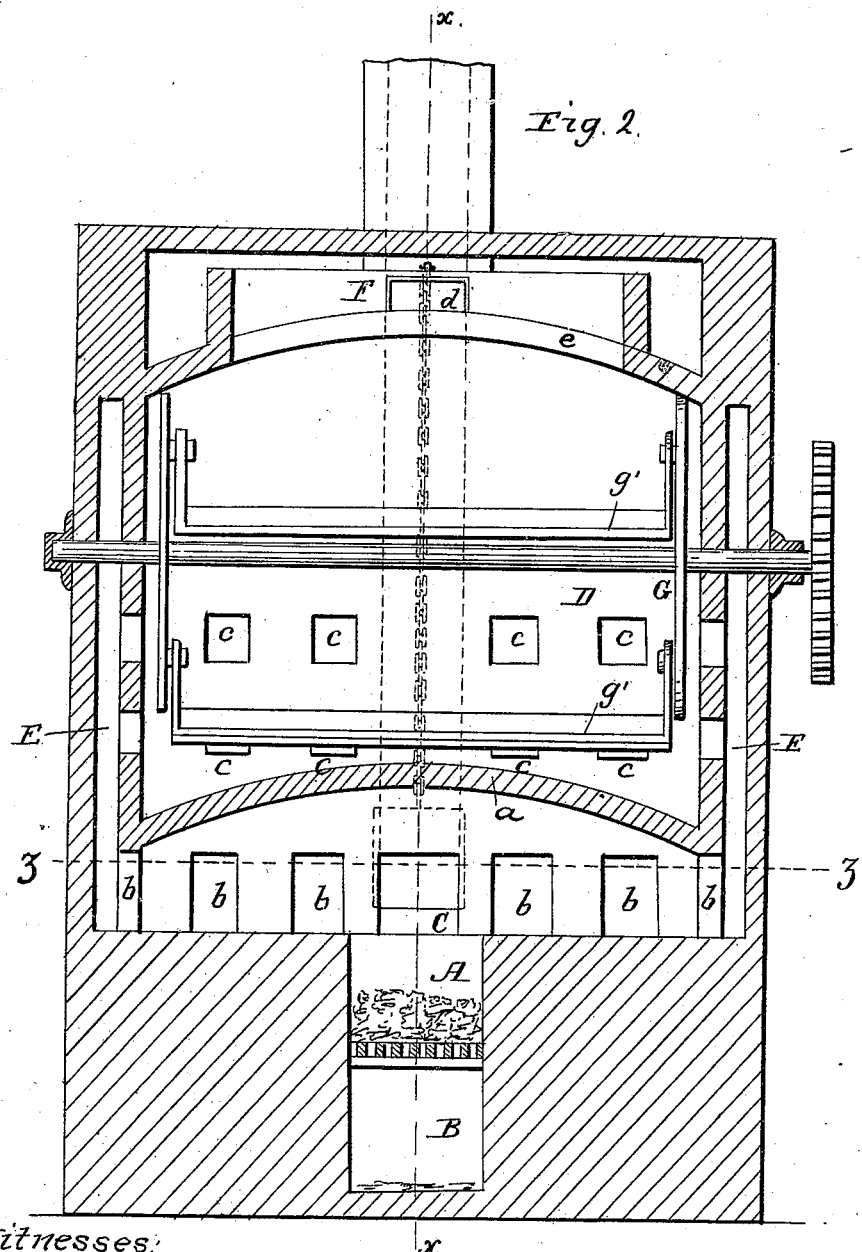
Figure 3:
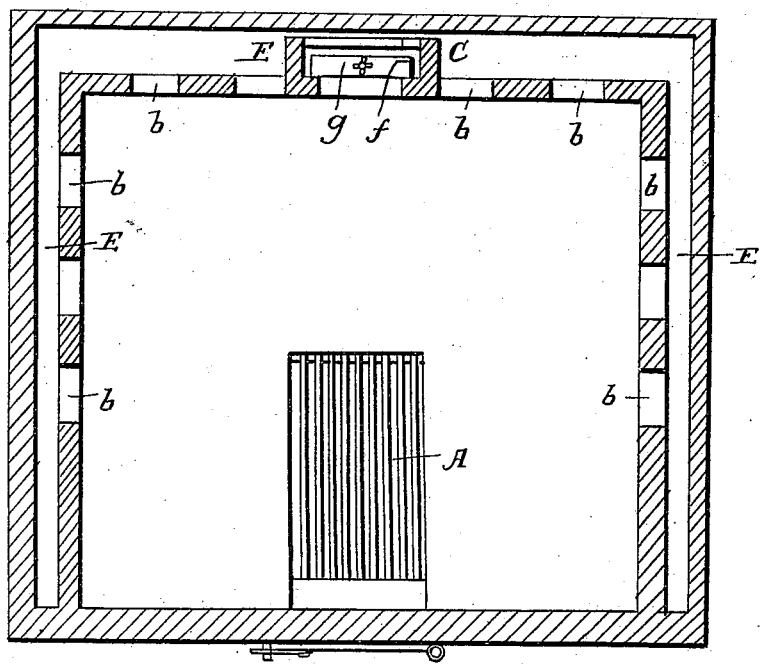

Figure 1 is a vertical section of the oven; Fig. 2, a cross-section through red line $y$ $y$, Fig. 1; Fig. 3, a horizontal section through red line $z$ $z$, Fig. 2.

Letter A represents the fire-box furnished with suitable grate-bars and an ash-pit B. The products of combustion from the fire-box ascend into a fire-chamber covered by the arch $a$, which also forms the bottom of the baking-chamber D. This chamber is a shell built within the main walls of the oven, the back and sides being separated from the main walls by an intervening space or passage E, into which products of combustion pass through openings $b$ from the fire-chamber, and are admitted to the baking-chamber through the openings $c$ in the side walls thereof.

Letter $e$ represents an uptake or passage of considerable size in the front part of the top of the oven, which communicates by the flue F with the chimney. This draft-passage is used for the escape of steam and for attracting products of combustion into the baking-chamber from the fire-box, and is provided with a suitable regulating-damper $d$.

Letter G represents what is commonly called the "reel," which consists of a pair of rotating circular heads or plates secured to a horizontal shaft, which passes through the oven and is supported by bearings in the outer side walls of the oven, and provided with a pulley or suitable gear for connecting with motive power.

Letters $g'$ represent gravitating-pans, which support the bread while baking and carry it about the oven.

E' is the charging-door.

$a'$ is a cam, which takes against the roller on the front edge of the gravitating bread-pans and tips up the pans successively as they are brought in contact with it by the rotation of the reel for the purpose of discharging the bread into the chute or inclined passage-way $F'$, which is provided with a door hinged at the top, and so arranged as to open by the weight of the bread and to close by gravity after the bread passes out.

Letter C represents a flue at the back of the oven connected with the chimney above and with the fire-chamber below the oven, the opening between the fire-chamber and flue being regulated by a damper $f$, which is moved up and down for that purpose by a chain $g$, which is attached to the damper and passes up behind the oven through the flue C and over the top of the oven through a small pipe or passage-way to the front, where it hangs down within reach of the operator.

The operation of the above-described oven as improved by me is as follows: When the fire is first kindled, the damper $f$ is opened, allowing the smoke to pass directly to the chimney through the flue C. After it is kindled, the products of combustion of the anthracite (for the burning of which this oven is chiefly designed) are attracted into the perforated baking-chamber by opening the upper draft-damper $d$, which also affords the necessary outlet for the escape of steam from the bread.

The gravitating bread-pans are charged with bread at the door $E'$ as they are successively brought there for that purpose by the rotation of the reel, and are discharged by the cam and chute, if required; but in most small ovens or ovens of moderate size the cam and chute is dispensed with and the bread brought back to the charging-door and raked off the pan by the same operator who charges the pan.

Should unpleasant gases collect in the fire-box, or smoke, &c., arise from substances accidentally introduced in replenishing the fire, which in these ovens, when once kindled, is kept up continuously, the damper $f$ is opened to draw off the smoke or gases directly from the fire-box. It is also useful to prevent the accumulation of gases from the fire during the night when the oven is closed, the damper being kept a little way open for that purpose.

What I claim as my invention and improvement in bake-ovens is—

Combining with the fire-chamber of the mechanical bake-oven known as the reel oven, a flue or passage-way provided with a suitable damper leading from the fire-chamber to the chimney, and so arranged with relation to the perforated baking-chamber containing the reel and bread-pans as to conduct smoke, gases, &c., (heretofore allowed to pass into the baking-chamber,) directly from the fire-chamber to the chimney, substantially as described.

IVERSON W. KNAPP.

Witnesses:
B. GIROUX,
M. M. LIVINGSTON.